United States Patent [19]

Bilhorn

[11] Patent Number: 4,913,967

[45] Date of Patent: Apr. 3, 1990

[54] ANTI-FOGGING STRUCTURAL SHEET

[76] Inventor: J. David Bilhorn, 652 Hwy. 73, Edgerton, Wis. 53534

[21] Appl. No.: 142

[22] Filed: Jan. 2, 1987

[51] Int. Cl.[4] .......... B32B 9/04

[52] U.S. Cl. .......... 428/411.1; 428/412; 427/322; 427/359; 427/369

[58] Field of Search .......... 427/359, 369, 370, 428, 427/322; 428/412, 411.1; 156/244.16, 244.24, 244.27; 264/45.9-49, 46.1, 171

[56] References Cited

U.S. PATENT DOCUMENTS 4,173,490 11/1979 Rotenberg et al. .......... 106/287.14
4,267,215 5/1981 Riggs .......... 427/428 X
4,323,597 4/1982 Olson .......... 427/384 X
4,673,708 6/1987 Rock et al. .......... 525/66
4,792,492 12/1988 Lee .......... 428/412 X

OTHER PUBLICATIONS

Polygal advertising literature, especially p. 7, literature from General Electric.

*Primary Examiner*—Michael Lusignan
*Attorney, Agent, or Firm*—Barnes & Thornburg

[57] ABSTRACT

The present invention discloses a process for treating plastic structural sheets with a long lasting surfactant. The process encompasses exposing the surface of the sheet to a saturated solution of long lasting surfactant while the surface of the sheet is still tacky. A series of rollers forces the surfactant into the surface and distribute the surfactant uniformly across the sheet.

20 Claims, 1 Drawing Sheet

ANTI-FOGGING STRUCTURAL SHEET

BACKGROUND AND SUMMARY

The use of polycarbonate for twin wall sheets gives an outstanding product for use in the greenhouse industry. However, to provide an even better product, coatings can be applied to the polycarbonate or embedded in the polycarbonate.

For example, non ultra violet stablized (UV-stablized) polycarbonate is susceptable to UV-radiation, particularly in the range of 290–300 Nm. This problem can be overcome with the help of UV-stabilizers, either embedded in the polycarbonate or in a UV-stable toplayer (coated or co-extruded) thus damaging radiation is converted into heat.

These stabilizers can be added directly to the base material to avoid additional processing. However, this adversely effects the processability of the sheet and is very expensive. All that is effectively needed is a thin surface layer with a high concentration of UV-stabilizers.

This thin surface layer can be achieved either by coating or co-extrusion of the twin wall sheet. The coating of the twin wall sheets can be applied on line by spraying or by roller coating. Spraying works well with odd shaped objects yet the overspray results in loss of coating.

Roller coating has been used for coating flat sheets which need a one-side coating layer. For twin wall sheets, reversed rollercoating has been found to be both convenient and economical. The rollercoat is installed on line, followed directly by an oven. The oven is used to provide drying time. The length of the oven is dependent on the given speed of the extrusion line.

Surfactants have not typically been applied during this manufacturing process.

Surfactants have previously been sprayed on the sheets after the sheet has been constructed and cured. When spraying the surfactant on to the sheet, it is difficult to control a uniform thickness across the entire surface of the sheet. Also, the spray mist is not forced into the sheets. It has been found that this sprayed on surfactant can be washed off after a number of applications of water. These applications come from cleaning or condensation running off the sheets.

In polyethylene films, a substitute product for the structural sheets, the surfactant has been formed embodied in the product. Polyethylene films are typically made in large silos and are "blown" into a large roll. The surfactant is introduced into the polyethylene sheeting when it is in a molten state. However, it has been found that such surfactants can lose their moisture dispersion characteristics after approximately two years. However, with polyethylene films, this is not a problem since the polyethylene films need to be changed on a greenhouse environment after a period of two years.

It is, therefore, an objective of the present invention to provide an improved structural sheet having a long lasting surfactant applied to a portion of the sheet.

It is a further object of the present invention to provide an improved anti-fogging, moisture dispersing structural sheet which has a surfactant coated and embedded into the sheet.

It is still a further object of the present invention to provide a process to both embed and coat a surfactant on a plastic structural sheet so that the coat is uniformly applied to the sheet and is not easily removed by washing.

It is yet a further object of the present invention to provide a textured plastic structural sheet having a greater surface area over which to dispense a surfactant.

It is yet still another object of the present invention to provide a sheet with one surface co-extruded with an ultra-violet restrictive coating and a second surface with a surfactant embedded and coated on the surface, so that no lacquer coating is needed on the structural sheeting to restrict UV.

A process for treating the surface of plastic structural sheets with a long lasting surfactant to increase the longevity of the anti-fogging and moisture dispersion characteristics of the sheet is disclosed in the present invention. A product formed by this process is an anti-fogging, moisture dispersing structural sheet. The process encompasses exposing the surface of the sheet to a saturated solution of long lasting surfactant while the surface of the sheet is still tacky. The surfactant is pressed into the sheet with a series of rollers which also serve to meter the precise amount of coating of surfactant being applied to the sheet. In preferred embodiments of the present invention, structural sheets are pin-striped or fingered as the sheet leaves the die head. This fingering or pin-striping increases the surface area for the surfactant to be applied and also helps to channel moisture off the sheet.

The surfactant is applied after the sheet has been constructed yet prior to the time when the sheet has completely cured. At this state, the surfactant can be embedded within a portion of the outer surface of the sheet.

The surfactant is especially adapted for application to polycarbonate structural sheets used in greenhouse structures. In this environment, the surfactant helps to disperse moisture before damaging droplets form on the interior walls of the greenhouse. Otherwise, droplets can fall on plants within the greenhouse and cause disease, destroy foilage, and restrict transmission of light.

Other objects, advantages and novel features of the present invention will now become readily apparent upon consideration of the following descriptions of preferred embodiments in conjunction with the drawings.

DETAILED DESCRIPTION OF THE DRAWINGS

Figure 1:
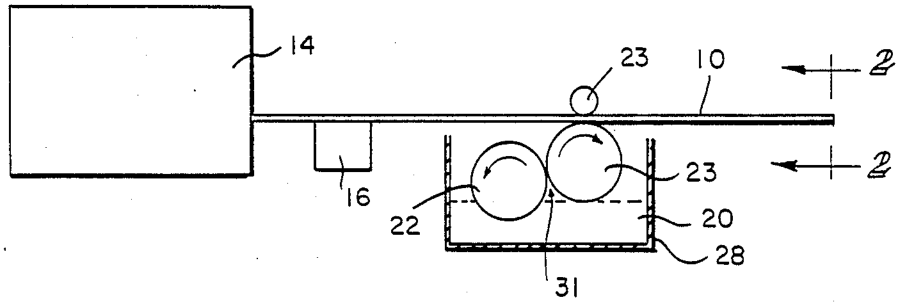
FIG. 1 is a schematic view of the coating process of a polycarbonate structural sheet coming out of an extruder.
Figure 2:
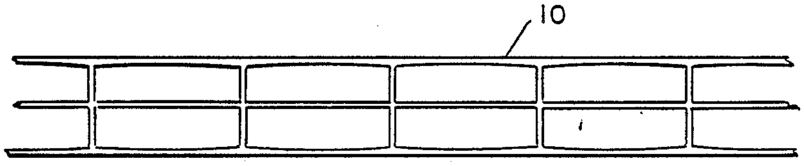
FIG. 2 is an end view of a structural sheet as seen along 2—2 of FIG. 1.
Figure 3:
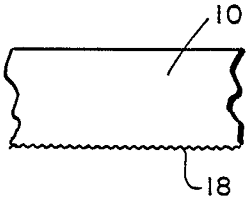
FIG. 3 is an enlarged end view showing the texturing of the polycarbonate structural sheeting.
Figure 4:
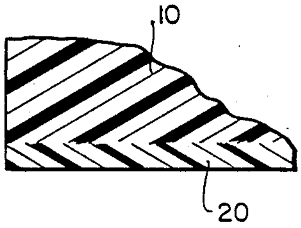
FIG. 4 is an enlarged sectional view showing the surfactant coating on the structural sheet.

Plastic structural sheetings, particularly polycarbonate and acrylic structural sheets 10, are typically formed in an extruding process. These extruded plastic structural sheets are often used as structural cover members in greenhouse environments. The sheet is, for example, extruded from a plastic resin material which is passed through a die head 12 at a temperature of approximately 200° to 280° Centigrade. As the product leaves the die head 12, it is in a semi-solid or tacky state. Typically, within ten to fifteen feet of leaving the die head of the extruder 14, the material sets to a solid structural sheeting. This obviously is dependent on the rate of travel. In one of the illustrated preferred embodiments of the structural sheets, a groove device 16 provides additional texture to the sheeting by indenting the surface thereby forming pin-stripes or small fingers or grooves 18 within the surface of the sheet 11. These groove devices have been used in the prior art. This textured sheet 11 provides additional surface area for a liquid surfactant to coat and embed. Applicant has found a surfactant called Sun Clear manufactured by Solar Sun Still of Setauket, N.Y., to work particularly well in this invention. However, it is contemplated most equivalent surfactants would work also.

After the structural sheet leaves the die head, it is saturated with a surfactant 20 while still tacky. This surfactant is applied in a preferred embodiment by a reverse roller process. This "reverse roller process" has been used to apply other substances to sheets. For example, the "reverse roller process" can be used to apply laminates. In the application of laminates the rollers applying the liquid were typically above the sheets. However, other rollers could also be used as long as they apply the surfactant and force the surfactant into the sheet. The pressure producing roller should be used simultaneously or after the surfactant application. The "reverse roller process" consists of a series of application rollers 21, measuring rollers 22 and pressure rollers 23. Pressure rollers 23 hold the sheet against application roller 21. Rollers 23 and 22 provide the pressure means whereby the surfactant is forced into the tacky sheet. The amount of surfactant applied to the sheet is determined by the opening 31 between roller 22 and roller 23. The roller turns in opposite directions allowing the surfactant to be carried through the opening. The surfactant is carried along the surface of roller 23 and applied to the sheet. The speed of the line and the opening 31 determines the application rate. Roller 23 simultaneously applies the surfactant and forces the surfactant into the sheet. The excess material is gathered in fluid retaining structure 28.

In the preferred embodiments with textured surface sheets, the texturing on the sheet helps to shed water from the structural sheet by the use of the grooves. Water accumulates in these grooves and is channeled to the exterior portion of the structure. The surfactant also tends to allow condensate to run off the structure in sheets rather than forming droplets. The surfactant and textured sheets facilitate the removal of moisture from the sheet.

In additional preferred embodiments, the structural sheeting is not only provided with surfactants on one surface, but, through a co-extrusion process, an ultra-violet inhibitor is applied to the opposite surface of the structural sheets. This ultra-violet inhibitor is co-extruded into the resin and integrally formed in one surface of the sheet. The surfactant can coat the second surface of the sheet. This new improved sheet provides a structural sheet integrally formed with U.V. inhibitor and surfactant. Lacquered finishes or polyethylene sheets do not have to be applied at a later stage to provide UV inhibitor or surfactant. The structural sheet is ready to be used in construction without additional labor other than cutting.

Although the present invention has been described in detail, the same is by way of illustration and example only and is not to be taken by way of limitation. The spirit and scope of the present invention are to be limited only by the terms of the appended claims.

What is claimed is:

1. A process for treating the surface of a plastic structural sheet with a long lasting surfactant to increase the longevity of the anti-fogging and moisture dispersion characteristics the surfactant generates on the sheet, which comprises, exposing the surface of the sheet to a saturated solution of long lasting surfactant while the surface of the sheet is still tacky, and providing pressure means to the surface of the sheet to force the surfactant into the surface of the sheet.

2. The process of claim 1, wherein the pressure means includes at least one roller to force the surfactant into the tacky sheet.

3. The process of claim 2, wherein at least one roller applies the surfactant simultaneously as pressure is applied.

4. The process of claim 1, wherein the structural sheet is formed of polycarbonate material.

5. The process of claim 4, wherein a polycarbonate structural sheet has a co-extruded first surface and a second surface treated in accordance with claim 1.

6. The process of claim 1, wherein the pressure means includes a series of rollers which apply the surfactant to the sheet as the rollers force the surfactant into the surface.

7. The process of claim 1, wherein a series of rollers measure and apply a precise coating of surfactant to the structured sheet.

8. The process of claim 1, wherein the surfactant is applied to the structural sheet prior to the sheet cooling to a temperature of where the sheet sets into a solid state.

9. The process of claim 1, wherein the surfactant is applied to the structural sheet close to a die head which forms the sheet while the sheet is still tacky.

10. The process of claim 1, wherein the structural sheet is formed of acrylic material.

11. A process for treating the surface of a plastic structural sheet with a long lasting surfactant to increase the longevity of the anti-fogging and moisture dispersion characteristics the surfactant generates on the sheet, which comprises, first, texturing the surface of the sheet by pin-striping the surface as the sheet exits the die head, then, coating the surface of the sheet with a saturated solution of long lasting surfactant while the surface of the sheet is still tacky, and providing pressure to the surface of the sheet with at least one roller to further force the surfactant into the surface of the sheet.

12. The process of claim 11, wherein the pressure is applied simultaneously to the sheet during the coating process.

13. The process of claim 11, wherein the pressure is applied after the coating process.

14. The process of claim 5, wherein the co-extruded first surface includes ultra-violet inhibitor.

15. A plastic structural sheet with a long lasting surfactant to increase the longevity of the anti-fogging and moisture dispersion characteristics the surfactant generates on the sheet, prepared by a process comprising the steps of:

exposing the surface of the sheet to a saturated solution of long lasting surfactant while the surface of the sheet is still tacky, and providing pressure means to the surface of the sheet to force the surfactant into the surface of the sheet.

16. The plastic structural sheet according to claim 15, wherein the pressure means includes at least one roller to force the surfactant into the tacky sheet.

17. The plastic structural sheet according to claim 16, wherein at least one roller applies the surfactant simultaneously as pressure is applied.

18. The plastic structural sheet according to claim 15, wherein the structural sheet is formed of polycarbonate material.

19. A plastic structural sheet with a long lasting surfactant to increase the longevity of the anti-fogging and moisture dispersion characteristics the surfactant generates on the sheet, prepared by a process comprising the steps of:

first, texturing the surface of the sheet by pin-striping the surface as the sheet exits the die head;

then, coating the surface of the sheet with a saturated solution of long lasting surfactant while the surface of the sheet is still tacky; and providing pressure to the surface of the sheet with at least one roller to further force the surfactant into the surface of the sheet.

20. The plastic structural sheet according to claim 19, wherein the structural sheet is formed of polycarbonate material.

* * * * *

UNITED STATES PATENT AND TRADEMARK OFFICE
CERTIFICATE OF CORRECTION

PATENT NO. : 4,913,967

DATED : April 3, 1990

INVENTOR(S) : J. David Bilhorn

It is certified that error appears in the above-identified patent and that said Letters Patent is hereby corrected as shown below:

On the title page item [56] under References Cited:

Please add the following cited references:

| | | | |
|---|---|---|---|
| 4,292,773 | 10/1981 | Laing et al. | 52/171 |
| 2,400,720 | 5/1946 | Staudinger et al. | 117/118 |
| 3,679,531 | 7/1972 | Weinand et al. | 165/177X |
| 1,674,677 | 12/1928 | Will | |

Foreign Patents:

| | | |
|---|---|---|
| 1,043,272 | 5/1963 | United Kingdom |
| 2,802,179 | 1/1978 | Germany |

Signed and Sealed this

Seventeenth Day of March, 1992

*Attest:*

HARRY F. MANBECK, JR.

*Attesting Officer*

*Commissioner of Patents and Trademarks*